United States Patent
Eichhorn et al.

(10) Patent No.: US 11,982,593 B2
(45) Date of Patent: May 14, 2024

(54) REAL-TIME, NON-DESTRUCTIVE CONTAINER CLOSURE INTEGRITY MEASUREMENT

(71) Applicant: West Pharmaceutical Services, Inc., Exton, PA (US)

(72) Inventors: Christian Eichhorn, Pottstown, PA (US); Sindhuja Kuchibhatla, Kendall Park, NJ (US); Michael Sullivan, Birdsboro, PA (US); Kevin Gribowicz, Malvern, PA (US)

(73) Assignee: West Pharmaceutical Services, Inc., Exton, PA (US)

( * ) Notice: Subject to any disclaimer, the term of this patent is extended or adjusted under 35 U.S.C. 154(b) by 388 days.

(21) Appl. No.: 17/425,778

(22) PCT Filed: Jan. 25, 2020

(86) PCT No.: PCT/US2020/014908
§ 371 (c)(1),
(2) Date: Jul. 26, 2021

(87) PCT Pub. No.: WO2020/154570
PCT Pub. Date: Jul. 30, 2020

(65) Prior Publication Data
US 2022/0187155 A1 Jun. 16, 2022

Related U.S. Application Data

(60) Provisional application No. 62/796,886, filed on Jan. 25, 2019.

(51) Int. Cl.
*G01M 3/32* (2006.01)
*B65D 55/02* (2006.01)

(52) U.S. Cl.
CPC ......... *G01M 3/3209* (2013.01); *B65D 55/028* (2013.01); *B65D 2203/10* (2013.01)

(58) Field of Classification Search
None
See application file for complete search history.

(56) References Cited

U.S. PATENT DOCUMENTS 5,921,419 A * 7/1999 Niedospial, Jr. ..... B65D 51/002
215/247
7,772,981 B1 8/2010 Lambert
(Continued)

FOREIGN PATENT DOCUMENTS

EP 2826458 A1 1/2015
FR 3028844 5/2016
(Continued)

*Primary Examiner* — Brandi N Hopkins
*Assistant Examiner* — Nigel H Plumb
(74) *Attorney, Agent, or Firm* — Blank Rome LLP

(57) ABSTRACT

Systems and methods for determining Container Closure Integrity (CCI) in a container system comprising a container, an elastomeric stopper, and a retainer for retaining the stopper in place are disclosed. The systems and methods involve disposing, within a seal assembly, a component configured to sense a degree of compression of the elastomeric stopper. In a first implementation, the elastomeric stopper comprises an embedded positioning component embedded within the elastomeric material. The position of the positioning component is sensed using a detection system and the integrity of the closure is determined based on the position of the embedded component. In a second implementation, a force sensitive resistor is disposed within the seal stack to measure the compression of the elastomeric stopper. The compression of the elastomeric stopper is correlated to the integrity of the seal.

30 Claims, 8 Drawing Sheets

(56) References Cited

U.S. PATENT DOCUMENTS

2008/0258401 A1* 10/2008 Cotton ............ G06K 19/07798
                                                                  277/321
2014/0184390 A1    7/2014 Elizondo, II

FOREIGN PATENT DOCUMENTS

| JP | H04132924 | 5/1992 |
| JP | 2003104324 | 4/2003 |
| JP | 2003144524 | 5/2003 |
| JP | 2015517378 | 6/2015 |
| JP | 2018071786 | 5/2018 |
| WO | 2006/016184 A2 | 2/2006 |
| WO | 2020028520 | 2/2020 |

* cited by examiner

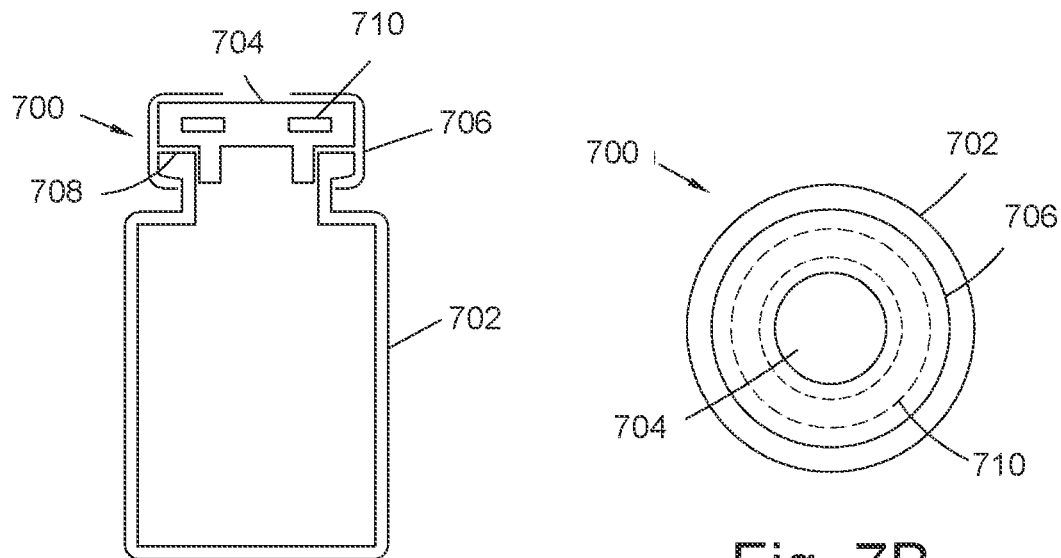
Fig. 7A
Fig. 7B
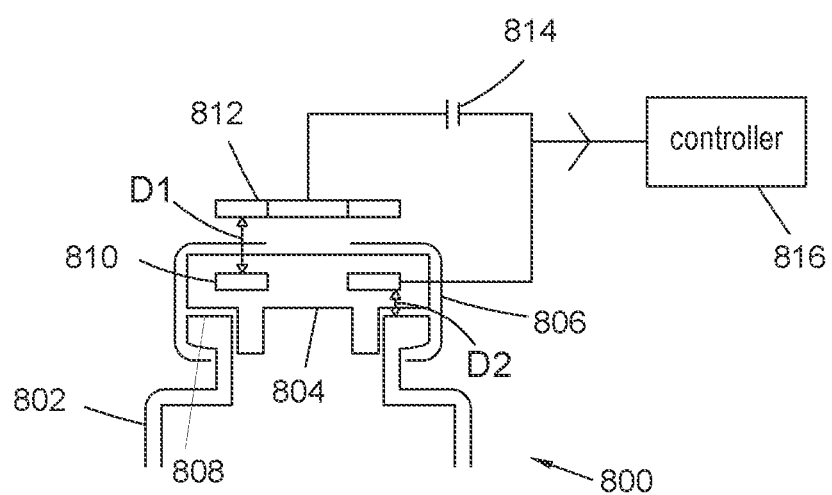
Fig. 8

REAL-TIME, NON-DESTRUCTIVE CONTAINER CLOSURE INTEGRITY MEASUREMENT

CROSS-REFERENCE TO RELATED APPLICATIONS

This application is a Section 371 of International Application No. PCT/US20/14908, filed Jan. 24, 2020, which was published on Jul. 3, 2020, under International Publication No. WO 2020/154570 A1, which claims priority to U.S. Provisional Application No. 62/796,886, filed on Jan. 25, 2019, the disclosures of which are incorporated herein by reference in their entireties.

TECHNICAL FIELD

The disclosure relates to systems and methods for determining Container Closure Integrity (CCI) in container systems that allows for non-destructive testing of CCI. More particularly, the disclosure relates to systems and methods for determining the position and/or compression of an elastomeric stopper in a sealed container system.

BACKGROUND

Pharmaceutical products are stored in a variety of container systems, including vials and medicament reservoirs for use with drug delivery devices. Closures for the container systems should provide a barrier that acts to protect the stability and sterility of the pharmaceutical product in the container system during its shelf-life by preventing the ingress of microorganisms, moisture, and gases into the interior volume of the container.

Container Closure Integrity (CCI) testing is used to evaluate the appropriateness of closure seals for a container system. Current CCI test methods include microbial and dye ingress tests, qualitative and quantitative headspace testing, vacuum or pressure decay testing, high voltage leak detection (HVLD) and helium leak detection.

However, these methods are limited by their destructive nature, the complex laboratory apparatus required to carry out the testing, and their unsuitability for certain medicament types (e.g. HVLD).

A need exists for an improved method of CCI testing.

SUMMARY

In general terms, this disclosure provides improved methods and systems for determining container closure integrity (CCI) by measuring the compression force within a seal stack that comprises the rim of a container, an elastomeric stopper, and a retainer for compressing the stopper against the rim of the container. In embodiments of the present invention, the seal stack preferably comprises a sensor, or a detectable component disposed within the seal stack to directly measure the compression of the elastomeric stopper so that the CCI of the container can be measured, in a non-destructive manner, at different points in the shelf-life of the product. For example, embodiments of the present invention may be used to determine CCI for a container system at at least one of the following points during the lifetime of the product: Immediately after sealing, at the end of a manufacturing line, during or after a period of storage for the product, or at the point of care.

In a first aspect, there is provided a method for determining container closure integrity in a container system comprising a container, an elastomeric stopper comprising an embedded positioning component, and a retainer for retaining the stopper in place, wherein the elastomeric stopper is confined between a rim of the container and the retainer to seal the container. The method comprises: (I) determining, using a detection system, a position of the embedded positioning component; and (ii) based on the measured position of the embedded detectable component, determining container closure integrity. By sensing the position of an embedded positioning component within a seal stack made up on the elastomeric stopper, the retainer, and a rim of the container, K is possible to determine the compression of the elastomeric stopper. This in turn can be used to determine the integrity of the seal for the container system.

In some embodiments, the method can further comprise determining a degree of compression of the elastomeric stopper based on the position of the embedded positioning component, and wherein the step of determining the container closure integrity is based on the determined degree of compression of the elastomeric stopper.

Optionally, this includes correlating the degree of compression with a residual seal force for the container system, wherein the step of determining container closure integrity is based on the residual seal force.

In some embodiments, the method also includes calibrating the detection system for detecting a position of the embedded positioning component for a predetermined container system configuration to correlate a detected position of the embedded positioning component with a residual seal force for the predetermined container system configuration.

The embedded positioning component may comprise a magnetic material (for example, a permanent magnet) and the step of determining the position of the embedded positioning component can comprise detecting a magnetic field strength.

The detection system can comprise a sensor, wherein the sensor detects the magnetic field strength.

In some embodiments, the embedded positioning component comprises an electrically conductive material configured as a first capacitor plate in a circuit, wherein the detection system comprises a second capacitor plate in the circuit, and wherein the step of determining the position of the embedded positioning component comprises detecting a capacitance of the circuit. The detection system may comprise a capacitance sensor, wherein the capacitance sensor measures the capacitance of the circuit.

The second capacitor plate can be formed by the seal, the seal being formed of an electrically conductive material. The method can include detecting a distance between the seal and the embedded positioning component.

In any of the embodiments described in this summary, the container system can comprise a cap. The cap can optionally comprise at least a portion of the detection system. For example, the cap can be configured to form a capacitance circuit with an electrically conductive positioning component, or the cap can comprise a sensor configured to sense a magnetic field strength.

The cap can further comprise one or more of a microcontroller, detection circuitry, a wireless communications module, and a power source. The method can further comprise communicating data indicative of container closure integrity to a remote device for display.

In a second aspect, there is provided a method for determining container closure integrity (CCI) in a container system comprising a container, an elastomeric stopper, and a retainer for retaining the stopper in place, wherein the elastomeric stopper is confined between a rim of the container and the retainer to seal the container. The method according to the second aspect comprises: (I) measuring, with a detection system, a resistance of a force sensitive resistor disposed between the elastomeric stopper and the rim of the container or the retainer; (I) determining container closure integrity based on the measured resistance value.

The method can further comprise determining a residual seal force based on the measured resistance, wherein the step of determining container closure integrity is based on the residual seal force.

Advantageously, the method further comprises: calibrating the detection system for a predetermined container system to correlate a measured resistance for the force sensitive resistor; and determining the container closure integrity based on the measured resistance. By calibrating the system, a measured value (e.g. a measured resistance value) can be directly equated to CCI.

In some embodiments, the container system can comprise a cap, wherein the cap houses at least a portion of the detection system. For example, the cap can comprise a resistance meter in communication with the force sensitive resistor to measure the resistance of the force sensitive resistor within the seal stack.

The cap can further comprise one or more of a microcontroller, detection circuitry, a wireless communications module, and a power source. The method can further comprise communicating data indicative of container closure integrity to a remote device for display.

In a third aspect, there is provided a method of configuring, validating or monitoring a tiling line for producing filed container systems, the method comprising: (i) tiling and sealing one or more container systems, the sealed container system comprising a filed container, an elastomeric stopper comprising an embedded positioning component, and a retainer for retaining the stopper in place, wherein the elastomeric stopper is confined between a rim of the container and the retainer to seal the container, wherein the method further comprises: (ii) determining, using a detection system, a position of the embedded positioning component; (iii) based on the measured position of the embedded detectable component, determining container closure integrity.

The method according to the third aspect may also comprises any of the features described above with reference to the first aspect.

In a fourth aspect, there is provided a method of configuring, validating or monitoring a filling line for producing filled container systems, the method comprising: (i) filing and sealing one or more container systems, the sealed container system comprising a
  filed container, an elastomeric stopper, and a retainer for retaining the stopper in place, wherein the elastomeric stopper is confined between a rim of the container and the retainer to seal the container, and wherein the method further comprises: (IQ measuring, with a detection system, a resistance of a force sensitive resistor disposed between the elastomeric stopper and the rim of the container or the retainer; (II) determining container closure integrity based on the measured resistance value.

The method according to the fourth aspect may also comprises any of the features described above with reference to the second aspect.

In a fifth aspect, there is provided a method of testing CCI for a container system at a point of care. The method according to the fifth aspect comprises: (q determining, using a detection system, a position of an embedded positioning component within a container system comprising a container, an elastomeric stopper, and a retainer sealing the stopper against a rim of the container; and (IQ based on the measured position of the embedded detectable component, determining container closure integrity.

The method according to the fifth aspect may also comprise any of the features described above with reference to the first aspect.

In a sixth aspect, there is provided a method of testing CCI for a container system at a point of care. The method according to the sixth aspect comprises: (i) measuring, with a detection system, a resistance of a force sensitive resistor disposed between an elastomeric stopper and rim of the container or a retainer; (ii) determining container closure integrity based on the measured resistance value.

The method according to the sixth aspect may also comprise any of the features described above with reference to the second aspect.

In a seventh aspect, there is provided a detection system for determining container closure integrity for a container system comprising a container, an elastomeric stopper comprising an embedded positioning component, and a retainer for retaining the stopper in place between the retainer and a rim of the container, the detection system comprising: a sensor configured to determine a position of the embedded positioning component within the container system; a controller configured to determine container closure integrity based on the measured position of the embedded positioning component. The detection system can include the container system.

The detection system may be comprised in a cap for the container system, or it may be provided in an external reader. In some embodiments, the detection system can be comprised in part in the container system and in part in a cap or external reader.

The controller can be configured to determine a degree of compression of the elastomeric stopper based on the position of the embedded positioning component and determine a container closure integrity is based on the determined degree of compression of the elastomeric stopper.

In at least some embodiments, the controller is further configured to correlate the determined degree of compression with a residual seal force for the container system and determine the container closure integrity based on the residual seal force.

The controller can be calibrated for detecting a position of the embedded positioning component for a predetermined container system configuration to correlate the detected position of the embedded positioning component with a residual seal force for the predetermined container system configuration. In some embodiments, the embedded positioning component comprises a magnetic material, and wherein the sensor is configured to detect a magnetic field strength.

The sensor may be configured to measure the magnetic field strength.

The embedded positioning component comprises an electrically conductive material configured as a first capacitor plate in a circuit, wherein the detection system comprises a second capacitor plate in the circuit, and wherein the controller is configured to determine the position of the embedded positioning component by detecting a capacitance of the circuit.

The capacitance sensor can be configured to measure the capacitance of the circuit formed with the two capacitor plates.

In some embodiments, the second capacitor plate can be formed by the seal, the seal being formed of an electrically conductive material, and wherein the sensor is configured to detect a distance between the seal and the embedded positioning component.

The container system can comprise a cap secured to the container system, wherein the cap comprises at least a portion of the detection system.

In at least some embodiments, the cap comprises one or more of a microcontroller, detection circuitry, a wireless communications module, and an optional power source. The wireless communication module can be configured to communicate data indicative of container closure integrity to a remote device for display.

In an eighth aspect, there is provided a detection system for determining container closure integrity for a container system comprising a container, an elastomeric stopper comprising a resistive force sensor, a retainer for retaining the stopper in place between the retainer and a rim of the container, wherein the force sensitive resistor is positioned between the elastomeric stopper and the retainer. The detection system comprises a sensor configured to determine a resistance of the force sensitive resistor within the container system; a controller configured to determine container closure integrity based on the measured resistance of the force sensitive resistor. The detection system can include the container system.

The detection system may be comprised in a cap for the container system, or it may be provided in an external reader. In some embodiments, the detection system can be comprised in part in the container system and in part in a cap or external reader.

The controller can be configured to determine a degree of compression of the elastomeric stopper based on the measured resistance of the force sensitive resistor and determine a container closure integrity is based on the determined degree of compression of the elastomeric stopper.

In at least some embodiments, the controller is further configured to correlate the determined degree of compression with a residual seal force for the container system and determine the container closure integrity based on the residual seal force.

The controller can be calibrated to correlate a measured resistance with a degree of stopper compression for a predetermined container system configuration and to determine CCI a residual seal force for the predetermined container system configuration based on the measured resistance.

The container system can comprise a cap secured to the container system, wherein the cap comprises at least a portion of the detection system.

In at least some embodiments, the cap comprises one or more of a microcontroller, detection circuitry, a wireless communications module, and an optional power source. The wireless communication module can be configured to communicate data indicative of container closure integrity to a remote device for display.

In a ninth aspect, there is provided a container system comprising a sterile seal, the container system comprising: a container, an elastomeric stopper comprising an embedded positioning component, and a retainer for retaining the stopper in place between the retainer and a rim of the container, wherein the embedded positioning system comprises: a magnetic material; or an electrically conductive material.

The container system may further comprise a cap. The cap can include one or more of: a microcontroller; detection circuitry comprising a sensor for detection a position of the embedded positioning component; wireless communications module; and an optional power source. The wireless communications module can be configured to communicate data indicative of container closure integrity to a remote device for display.

The microcontroller may be configured to measure (and optionally store) magnetic field strength and/or capacitance values. The microcontroller may determine CCI for the container based on the measured (and optionally stored) values, or it may communicate the stored data to an external reader configured to determine the CCI based on the received data.

Additionally or alternatively, the container system of the ninth aspect may further comprises any of the features described above in connection with the seventh aspect.

In a tenth aspect, there is provided a container system comprising a sterile seal, the container system comprising: a container, an elastomeric stopper, and a retainer for retaining the stopper in place, wherein the elastomeric stopper is confined between a rim of the container and the retainer to seal the container; and a force sensitive resistor disposed between the elastomeric stopper and the rim of the container or the retainer.

The container system may further comprise a cap. The cap can include one or more of: a microcontroller; detection circuitry configured to measure a resistance of the force sensitive resistor; wireless communications module; and an optional power source. The wireless communications module is configured to communicate data indicative of container closure integrity to a remote device for display.

The microcontroller may be configured to measure (and optionally store) a resistance of the force sensitive resistor. The microcontroller may determine CCI for the container based on the measured (and optionally stored) resistance value, or it may communicate the stored data to an external reader configured to determine the CCI based on the received data.

Additionally or alternatively, the container system of the tenth aspect may further comprises any of the features described above in connection with the ninth aspect.

In any of the embodiments described above, the cap may further comprise a hinge. The hinge can include an electrical contact providing contact between at least one of the microcontroller, the power source, and the detection circuitry; and at least one of the embedded positioning component and the force sensitive resistor.

In an eleventh aspect, there is provided a cap for any of the systems and methods described above. The cap may comprise detection circuitry configured to determine a container closure integrity for a container system. The detection circuitry may be configured to detect at least one of the following: a magnetic field strength of a magnetic element embedded within an elastomeric stopper; a capacitance of a circuit comprising, as one plate of a capacitor, an electrically conductive component disposed within an elastomeric stopper; a resistance of a circuit comprising a force sensitive resistor disposed within a seal stack of a container system.

By providing a cap configured to measure a physical quantity representative of the compression of the elastomeric stopper, a container system can be provided These advantages and others will be better understood from the following description.

BRIEF DESCRIPTION OF THE DRAWINGS

Specific embodiments are described below in the Detailed Description by way of example only and with reference to the accompanying drawings, in which:

FIG. 7A shows a cross-sectional side view of a sealed container system;

FIG. 7B shows a top view of the sealed container system of FIG. 7A;

FIG. 8 shows a system for determining Container Closure Integrity according to a first implementation;

Like reference numerals throughout the drawings related to like features.

DETAILED DESCRIPTION

Figure 1:
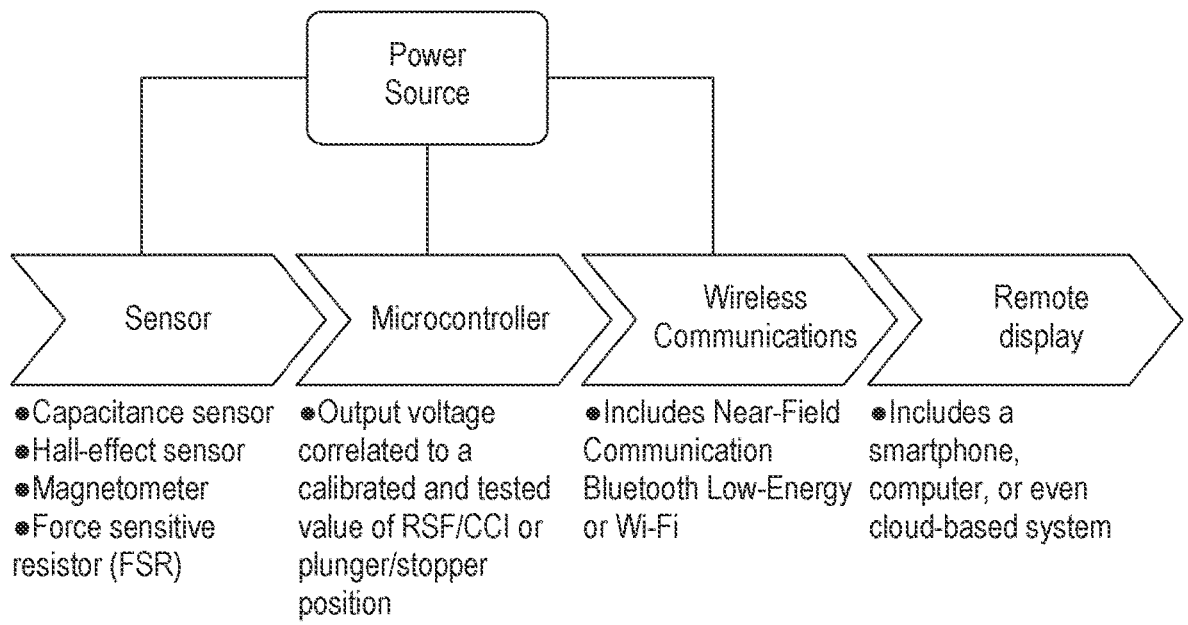
FIG. 1 shows an overall workflow of certain embodiments of the invention.

It will be understood that certain terminology is used in the following detailed description for convenience and is not limiting. The terms 'a', 'an' and 'the' should be read as meaning 'at least one'. The term 'comprising' will be understood to mean 'including but not limited to' such that systems or method comprising a particular feature or step are not limited to only those features or steps listed but may also comprise features or steps not listed.

It will also be appreciated by those skilled in the art that modifications may be made to the exemplary embodiments described herein without departing from the invention. Structural features of systems and apparatuses described herein may be replaced with functionally equivalent parts. Moreover, it will be appreciated that features from the embodiments may be combined with each other without departing from the disclosure.

In general terms, the present invention comprises an embedded sensor system that may provide assurance for Container Closure Integrity (CCI) in vial systems to allow for a more efficient and faster measurement. This invention may provide a real-time, non-destructive method for verifying CCI while the drug is in the container system. The invention comprises a capacitive-based sensor, magnetic-based sensors with the use of hall-effect sensors or magnetometers, or force sensitive resistors (FSR). The capacitive sensor includes one conductive plate embedded in the rubber stopper and the aluminum seal acting as the second conductive plate. The capacitance measured between the plates can be measured as a function of the distance between the plates and therefore, can be correlated to the residual seal force (RSF) or the crimp height of the vial to verify container closure integrity. The magnetic sensors consist of or comprise an embedded magnet that emits a magnetic field dependent on the depth of the magnet within the stopper. The magnetic field can be sensed through an integrated hall-effect sensor or magnetometer, as well as, using a magnetometer in a smartphone. Lastly, the percent compression within an elastomer can also be measured using an FSR which can output a variable voltage depending on the amount of force placed on the stopper.

Currently the sealing and capping processes of rubber stoppered glass vials impact the container closure integrity (CCI). Ensuring that there is an ideal fit between all components of the vial is necessary to maintain product sterility.

The present invention uses a capacitance meter, hall-effect sensor, magnetometer, or force-sensitive resistor (FSR) to measure the stack height of the seal in relation to the rubber stopper. These methods will then be correlated to values of CCI that have been calibrated and tested for these applications. This invention allows for a more efficient and faster screening to evaluate the sealing quality of the vial and therefore, provide CCI assurance. This invention uses a real-time, non-destructive method to measure RSF and correlate it to CCI. This invention of real-time CCI measurement will enable more efficient packaging and shipment validation. It will also provide end users a greater assurance of product safety, efficacy, and potentially even product authentication.

The solution includes a capacitance sensor that measures the stack height of a seal and stopper 204 on a vial container system 202 to ensure proper container closure integrity. The rubber stopper 204 contains a conductive substrate 210 (metal, transparent conductive films such as ITO or PEDOT, carbon nanotubes, graphene, etc.) that will act as one plate of a parallel capacitor with a metallic or other conductive seal 206 acting as the other plate of a parallel capacitor. The two plates 210, 206 can be connected to a microcontroller 216 and/or a battery 214 housed in the cap 250 of the container system. A second embodiment includes the use of an embedded magnet 410 in an elastomeric stopper 404 and the use of a hall effect sensor or magnetometer to measure the magnetic field that varies as the depth of the magnet 410 placed within the stopper 404 varies. A third embodiment includes the use of a force sensitive resistor (FSR) 620 to measure the percent compression and then correlate it to a reference value of CCI.

The sensors mentioned above are coupled to a microcontroller 216, 316, 416 that will perform the correlation and analysis of each output value to a tested value of CCI. The microcontroller output, which includes the verification of CCI, may be wirelessly transmitted to a remote display, such as a smartphone, laptop or computer, and/or a cloud-based system, for example via Bluetooth Low-Energy, RFID communication, such as Near-Field Communication, or Wi-Fi. A power source, 214, 414 will be required for Bluetooth Low-Energy and Wi-Fi communications; however, no power is required for RFID communication, for example Near-Field Communication (NFC). The overall workflow of the proposed invention is shown in FIG. 1.

Figures 2A, 2B:
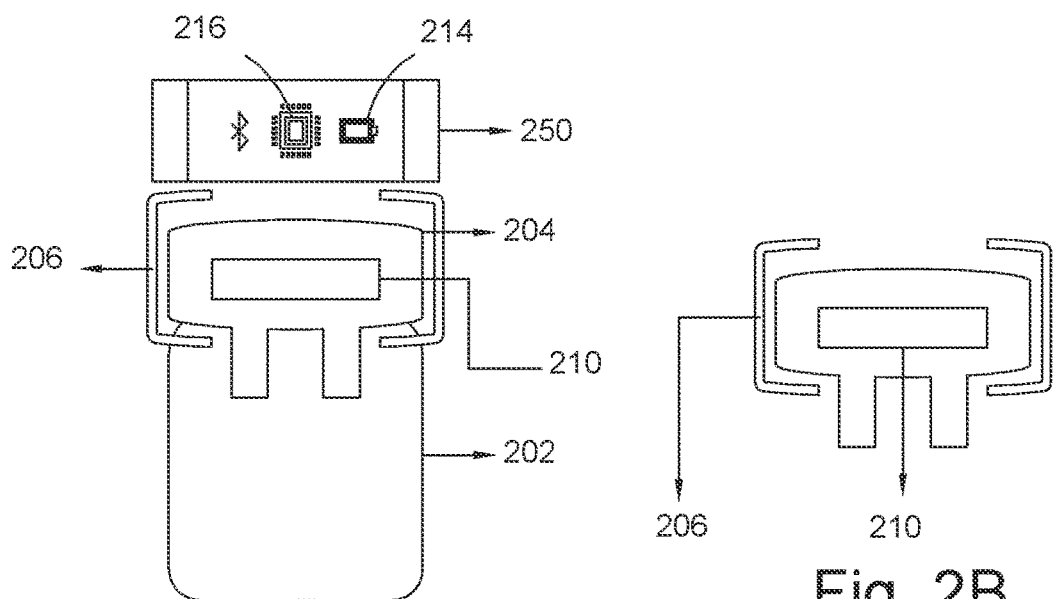
FIG. 2A shows an embedded conductive disc in the rubber stopper and plastic cap housing containing additional electronics, such as a battery, wireless communications, or microcontroller.
FIG. 2B shows an aluminium seal acting as one conductive plate and the embedded disc in the rubber stopper acting as the second conductive plate of a capacitive sensor within a deformable elastomer.
Figure 3:
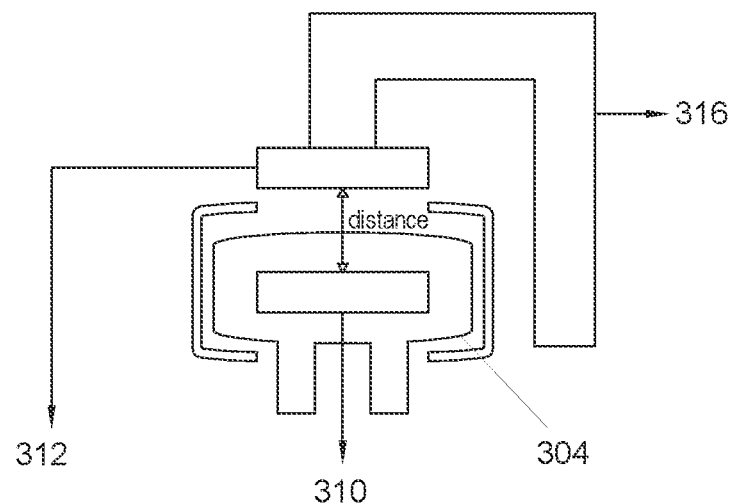
FIG. 3 shows an embodiment of the embedded conductive disc acting as one plate of the capacitor and an external conductive plate used to measure the distance between the two plates, correlated to a compression force.

The solution includes two conductive components 210, 206 separated by an elastomeric component 204 that is deformable to allow for the increase and decrease of the capacitance between the conductive components 210, 206, as shown in FIGS. 2A and 2B. The two conductive components 210, 206 act as the capacitive sensor that measures the capacitance and relays the value to a microcontroller 216, where the capacitance is analyzed and correlated to the compression force exerted on the elastomeric component 204. A battery 214 is used to power the circuit and this may include a flexible, printed battery, a solar cell, or a lithium ion battery, for example. The output of compression force may be relayed to a remote transceiver to alert the user that a specific residual seal force is within specified thresholds or tolerances. In addition, the two conductive plates 210, 206 of the capacitive sensor could be placed in separate components and a signal is only read when the two plates come together. For example, one conductive plate 110a of the capacitive sensor could be embedded within the rubber stopper 204, whereas the second conductive plate could be the aluminum seal 206 that is typically placed atop vial container systems, as shown in FIGS. 2A and 2B. Alternatively, as shown in FIG. 3, a stopper 304 can include a conductive component 310 and the second capacitor plate can be formed as a plate 312 in an external reader system. Any additional electronics could be housed in the plastic cap 250 of the container system or in the external system that can scan a container system to determine container closure integrity.

Figure 4:
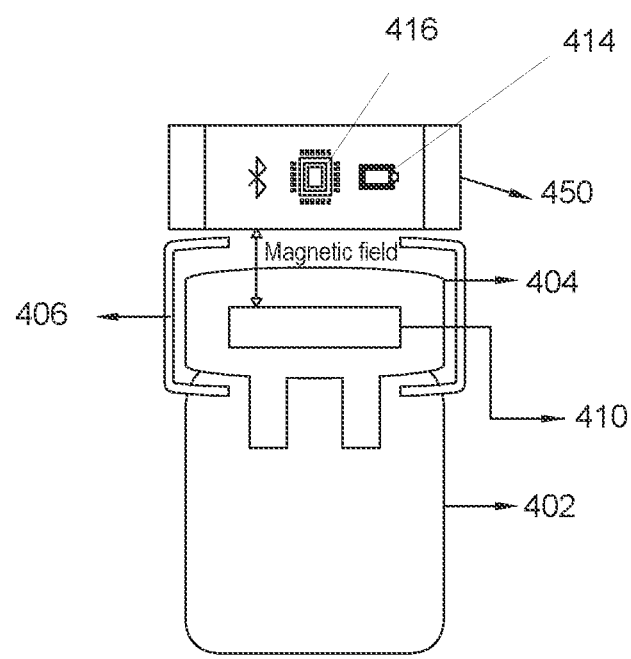
FIG. 4 shows a magnet embedded in the elastomeric stopper that emits a varying magnetic field with varying depth.
Figure 5:
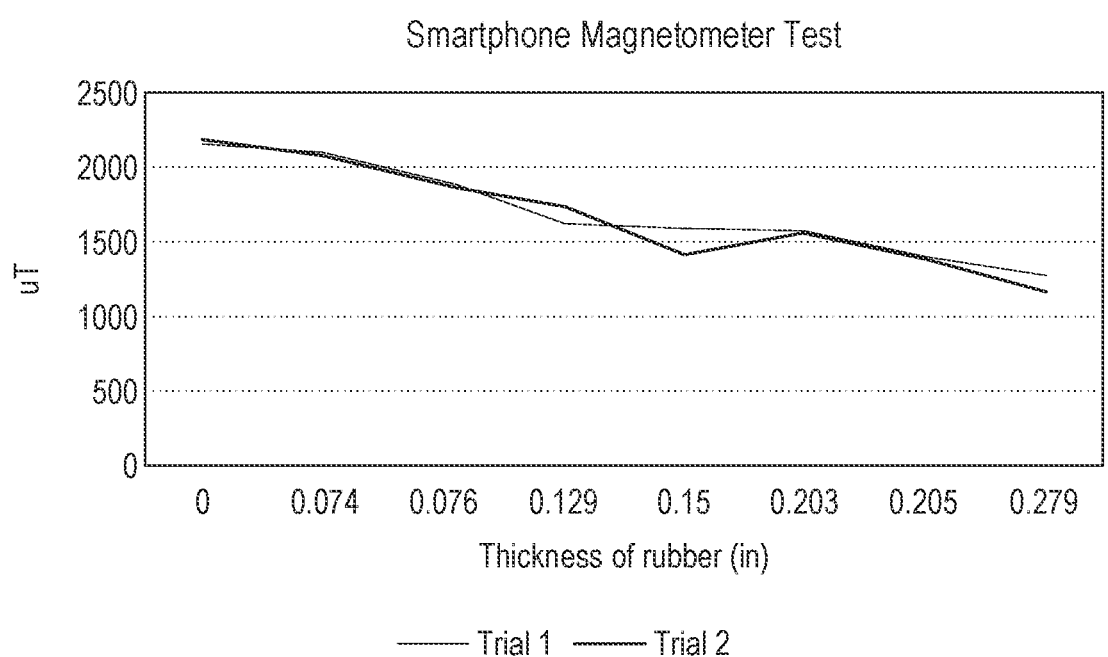
FIG. 5 shows a sample graph measuring depth of a magnet with a smartphone magnetometer with varying thicknesses of rubber placed between magnet and sensor.

A second embodiment of this invention includes an embedded magnet 410 in an elastomeric stopper 404 and a hall effect sensor coupled to a microcontroller 416, wireless communication (such as Bluetooth Low-Energy, RFID communication, for example Near-Field Communication, Wi-Fi, Zigbee, etc.), and a power source 414. The hall effect sensor can output a variable voltage in response to a magnetic field, which can increase or decrease depending on the depth of the magnet 410 in the elastomeric stopper 404, as shown in FIG. 4. An embedded magnet 410 can also be detected by a magnetometer, such as the one included in a smartphone, so that the depth of the magnet 410, and therefore, the amount of RSF can be easily detected with a scan on the elastomeric stopper 404. An example graph of the output with the use of a magnetometer is shown in FIG. 5.

Figure 6A:
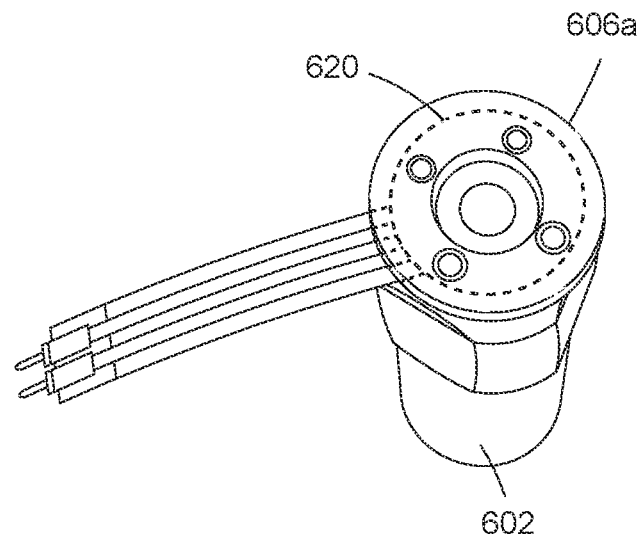
FIG. 6A shows a force sensitive resistor placed between the plastic cap above a stopper.
Figure 6B:
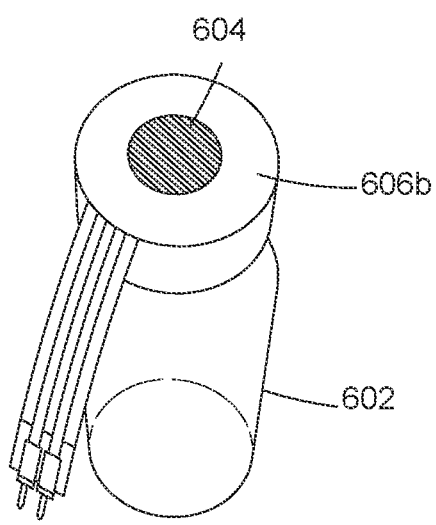
FIG. 6B shows a force sensitive resistor placed under the aluminium seal.

This invention may also comprise a force sensitive resistor (FSR) 620 that can be placed below the flange of the stopper to directly measure the RSF placed on the stopper, as shown in FIG. 6. This FSR sensor can use similar communication technologies as listed above to analyze and communicate the output signal as a function of time to verify CCI.

The present solution may allow for a more accurate, faster, and more efficient measurement system to assess container closure integrity. The present invention minimizes the need for a hand or visual inspection and therefore, improves the accuracy of the measurement as well as the time required. This invention may allow for the measurement of residual seal force and evaluate the crimp of a seal without having to use computed tomography or inspect the system by eye.

This invention could also include the use of a clear, conductive layer, such as indium tin oxide coated glass, to function as one plate of the capacitive sensing element on the vial. The present invention can also be used for the seal crimped portion of a cartridge system.

The output voltage could also indicate the position of an elastomeric component as the output voltage can be correlated to break-loose and extrusion forces, thereby signalling the position of the elastomeric component in a self-injection system.

Certain embodiments of the present invention can be compression molded into the elastomeric components or otherwise affixed into the surrounding components of a container system through an injection molding process. Electronic components may be embedded within an elastomer using a two-step molding or progressive molding process. The encapsulation of additional electronics, such as leads, wires, batteries, microcontrollers, etc. may be injection molded into the secondary components of the container systems.

The invention can be used to measure the residual seal force to verify container closure integrity and can improve the current process to be faster and more efficient. For example, the rubber stopper can encapsulate the capacitive sensing element with the microcontroller, battery, and wireless communications housed in the plastic cap of the container system. As the vial experiences a compressive force, the capacitive sensor can alert the user when a specified residual seal force or crimp height has been reached. Another example includes a rubber stopper with an embedded plate of the capacitive sensing element that is scanned to interface with the second plate of the capacitive sensor. The capacitance between the plates can then be correlated to a specific distance and therefore, the vial can be assessed whether the adequate crimp height has been achieved.

The present solution can also be used for track and trace of container systems to prevent counterfeiting and verify the authenticity of the product. The invention can also be used to alert the user that a container system has already been opened, pierced, or used before.

This technology may be applied to any stopper and vial container systems that require container closure integrity. Such systems would provide container closure integrity assurance. The present invention may be used for cartridge systems that comprise of a crimped seal.

Further specific implementations of the invention described above will now be described with reference to FIGS. 7A-13.

FIGS. 7A and 7B shows a container system for containing a pharmaceutical substance. The form of container system 700 shown in FIGS. 7A and 7B can be implemented in combination with any of the embodiments described herein. Like reference numerals are used to indicate like parts throughout the embodiments described herein.

FIG. 7A shows a side view of container system 700 comprising a container 702 and an elastomeric stopper 704 sealing the container 702. The container 702 shown in FIG. 7A is a vial configured to contain a pharmaceutical substance and may be formed of glass plastic or another suitable material. A retainer 706 secures the stopper 704 in place and compresses the stopper 704 against the rim 708 of the container 702. In the embodiment shown in FIG. 7A, the retainer 706 takes the form of an aluminium seal crimped over the stopper 704 and a flange on which the rim 708 of the container 702 is formed. However, it will be appreciated that other materials may be used to form a seal wrap. Alternatively (or additionally) the retainer 706 can take the form of a cap secured over the stopper 704 and configured to compress the stopper 704 against the rim 708 of the container 702.

In the embodiment shown in FIG. 7A, an embedded positioning component 710 is embedded in the elastomeric stopper 704. In some implementations, which will be described in greater detail below, the embedded positioning component 710 can be omitted and a force sensitive resistor may be positioned within the seal stack (the seal stack being formed of the rim of the container, the stopper and the retainer). In such embodiments, the force sensitive resistor may be embedded within the elastomeric stopper or it may be placed between the stopper and either the rim or the retainer.

FIG. 7B shows a top view of the container system 700. As shown in FIG. 7B, the positioning component 710 (or the force sensitive resistor, in embodiments employing this type of sensor) has an annular shape with an opening in the middle. The annular shape of the element 710 allows the stopper 704 to be pierced with a needle (not shown) to withdraw some or all of the contents of the container. Although the annular shape of the element 710 (or the force sensitive resistor, where used) is useful for allowing access to the interior of the container via the stopper, the annular shape is not essential. In some embodiments (in which the stopper is not configured to be pierced) the element (or the force sensitive resistor, where used) can be formed as a disk. In other embodiments, multiple discrete elements (or force sensitive resistors, where used) can be positioned around the periphery of the stopper, or a single element (or force sensitive resistor, where used) can be positioned at the periphery of the stopper to allow access to the interior of the container through the central region of the stopper shown in FIG. 7B.

As shown in FIG. 7B, the retainer 706 (formed as a crimped aluminium seal in this embodiment) extends over the positioning component 710. This ensures that the seal 706 and the element 710 overlap in a vertical direction in the seal stack, which allows the seal 706 and the element 710 to each act as a plate in a parallel plate capacitor (described in more detail below). Although this configuration is illustrated in FIG. 7B, overlap between the seal 706 and the element 710 is not present in all embodiments.

FIG. 8 shows a container system configuration 800, which is similar to the system 700 shown in FIG. 7, and in which the embedded positioning component 810 takes the form of an electrically conductive material which is configured to act as one plate of a capacitor. The electrically conductive material can comprise a metal, transparent conductive films such as ITO or PEDOT, carbon nanotubes, graphene, or other electrically conductive materials. A detection system for detecting a position of the embedded positioning component 810 comprises a second capacitor plate 812 connected via a power source 814 to the conductive positioning component 810. The detection system is configured as a capacitance sensor, wherein the capacitance reading for the circuit represents the distance D1 between the capacitor plates 810,812. The distance D1 between the capacitor plates 810, 812 determines the location of the embedded positioning element 810 relative to the rim 808 of the container 802 (e.g. distance D2). This is turn provides a measure of the compression of the stopper 804 and thus the residual seal force, which is indicative of CCI.

As shown in FIG. 8, the detection system is configured to communicate with a controller 816, for example a microcontroller configured to determine the distance D1 and determine CCI based on this measured value. As will be appreciated based on the following description, in particular the description of FIGS. 11-13, the controller 816 can be an external component in communication with a detection system configured to form an electrical contact with the embedded positioning component provided on the outside of the container system. Alternatively, as will be explained in more detail below, the controller 816 can be integrated into a cap for the container system that comprises components that may include, but are not limited to, a microcontroller, power source, and/or a communications module.

Figure 9:
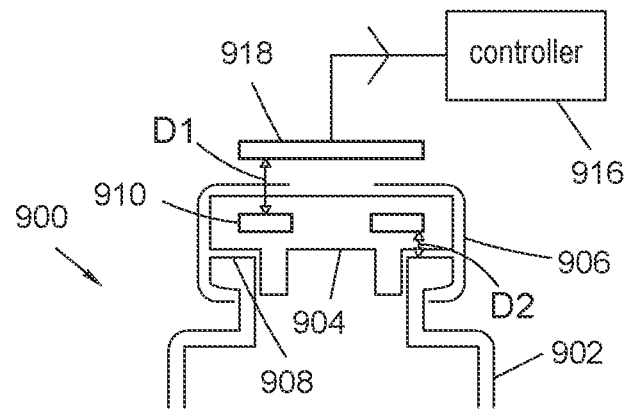
FIG. 9 shows a system for determining Container Closure Integrity according to a second implementation.

FIG. 9 shows another container system 900, in which an embedded positioning component 910 can be used to determine closure integrity for the container system 900. As shown in FIG. 9, the container system 900 has a similar configuration to the container system 800 shown in FIG. 8. However, instead of measuring capacitance to determine distance D1 (and D2), the embedded positioning component 910 of FIG. 9 is formed of magnetic material (in one example, a permanent magnet) and the detection system is configured to measure the magnetic field strength of the embedded positioning component 910 to determine the distance D1. In the embodiment shown in FIG. 9, the detection system comprises a magnetic field sensor 918, for example a Hall effect sensor or a magnetometer. Since the strength of the magnetic field varies as a function of distance from a magnetic material, a magnetometer can be used to determine the distance D1 between the embedded positioning component 910 and the sensor 918. This in turn can be used to determine the distance D2 between the embedded positioning component 910 and the rim 908 of the container 902, and thus the residual seal force and CCI of the container system 900. Like the embodiment shown in FIG. 8, the controller 916 of FIG. 9 can be an external component in communication with a detection system sense the position of the embedded positioning component 910. Alternatively, as will be explained in more detail below, the controller can be integrated into a cap for the container system that may include, but is not limited to, a microcontroller, power source, and/or communications module.

Figure 10:
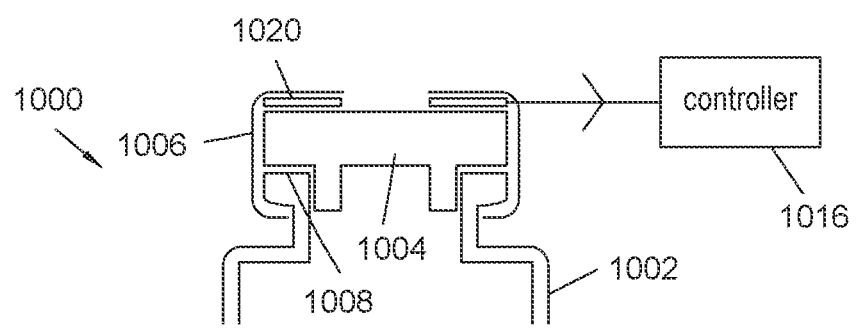
FIG. 10 shows a system for determining Container Closure Integrity according to a third implementation.

FIG. 10 shows another implementation of the invention that comprises a force sensitive resistor 1020 disposed within the seal stack (formed of the rim of the container, the stopper and the retainer) of a container system 1000. Although the force sensitive resistor 1020 can be embedded within the elastomeric stopper 1004 (similarly to positioning components 810, 910), the force sensitive resistor 1020 shown in FIG. 10 is disposed between the retainer 1006 and the stopper 1004. Although not shown in figures, the force sensitive resistor 1020 can also be disposed between the rim 1008 of the container 1000 and the stopper 1004 to measure the compressive force within the seal stack.

Rather than measuring a location of an embedded positioning component (as in the embodiments shown in FIGS. 8 and 9), the embodiment shown in FIG. 10 is configured to directly measure the compressive force within the seal stack by placing a force sensor within the stack. The measured force within the stack is representative of the residual seal force and thus the CCI for the container 1002. Like the embodiment shown in FIGS. 8 and 9, a controller 1016 is operatively connected to the sensor 1020. The controller 1016 can be an external component in communication with a detection system configured to sense the resistance of the force sensitive resistor 1020 and correlate this with a compression force within the stack. Alternatively, as will be explained in more detail below, the controller can be integrated into a cap for the container system that may include, but is not limited to, a microcontroller, power source, and/or communications module.

Figure 11:
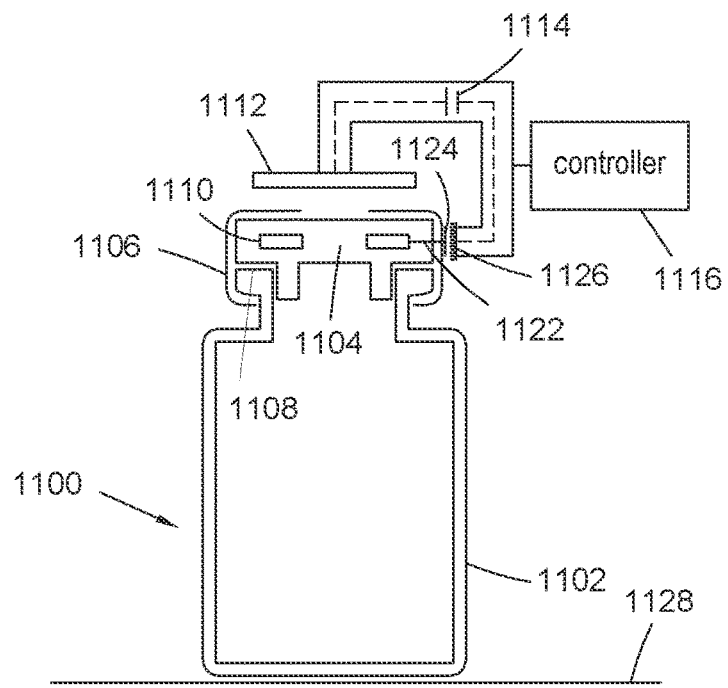
FIG. 11 shows a system for determining Container Closure Integrity for a container system using an external detection system.

FIG. 11 shows an embodiment in which a container system 1100 is configured with an electrically conductive embedded positioning component 1210 in the stopper (similar to the configuration shown in FIG. 8). As shown in FIG. 11, in this embodiment, an internal electrical connection 1122 connects the embedded electrically conductive positioning component 1110 with an external electrical contact 1124 on the exterior of the retainer 1106. The exterior contact 1124 is configured to contact a reader contact 1126 to form the capacitor circuit described with reference to FIG. 8. The reader contact 1126 is preferably configured to easily make contact with the external electrical contact 1124 as the container 1102 passes by the reader contact 1126 while being moved on a conveyer, for example. As shown in FIG. 11, the reader contact 1126 may take the form of an electrically conductive resilient wire brush which is configured to contact the external contact 1124. The configuration shown in FIG. 11 can be particularly well suited for use in a filling facility in which filled container systems travel along a filing line in the direction into and/or out of the page as shown in FIG. 11. The containers 1102 stand on surface 1128 so that the location of the rim 1108 relative to the fixed capacitor plate 1112 of the detection system does not vary with the passing of each container 1102. With the position of the rim 1108 known, variation in the measured capacitance between plates 1110, 1112 is attributable to the variation in compression of the stopper 1104. This can allow the detection circuitry of the reader to be calibrated to correlate a measured capacitance with CCI for passing containers. Thus, the system of FIG. 11 can be used to measure and monitor the CCI of container systems on a filling line.

It will be appreciated that embedded positioning components (or force sensitive resistors, where these are used) may be provided in each container leaving the filling line, to provide assurance of the CCI for each individual container system. Alternatively, embedded positioning components (or force sensitive resistors, where these are used) may be provided in a proportion of container systems, which allows for monitoring or statistical analysis of the performance of the sealing process for container systems.

Although not shown in FIG. 11, embodiments of the invention also include container and detection systems that are configured to measure the capacitance between a first plate formed by the element and a second plate that is formed by retainer (e.g. where retainer is formed as an aluminium seal). In such embodiments, the external contact pad for the element is insulated from the conductive seal. The external contact pad can contact a reader contact in the manner described above with reference to FIG. 11. The detection system can further comprise a second contact pad (e.g. in the form of a second wire brush, not shown) configured to contact the electrically conducive seal.

In these embodiments, rather than measuring the distance D1 between an external capacitor plate and the internal element, the measured distance D1 is the distance between the conductive retainer (e.g. an aluminium seal) and the embedded positioning component. It will be appreciated that this measurement is also indicative of the compression of the stopper and thus the CCI for the container.

In yet another embodiment, the detection system shown in FIG. 11 can be reconfigured to sense the distance between a magnetic positioning component and a magnetic field sensor (e.g. a Hall effect sensor)—as shown in FIG. 9. It will be appreciated that it is not necessary to form an electrical circuit between the embedded positioning component and sensor. For this reason, the contacts 1122, 21124, 1126 shown in FIG. 11 can be omitted.

Figure 12:
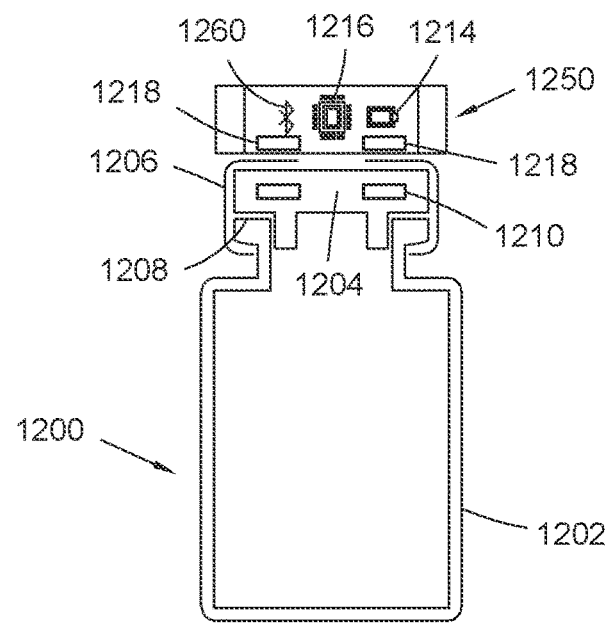
FIG. 12 shows a system for determining Container Closure Integrity for a container system using a first detection system integrated into a cap.
Figure 13:
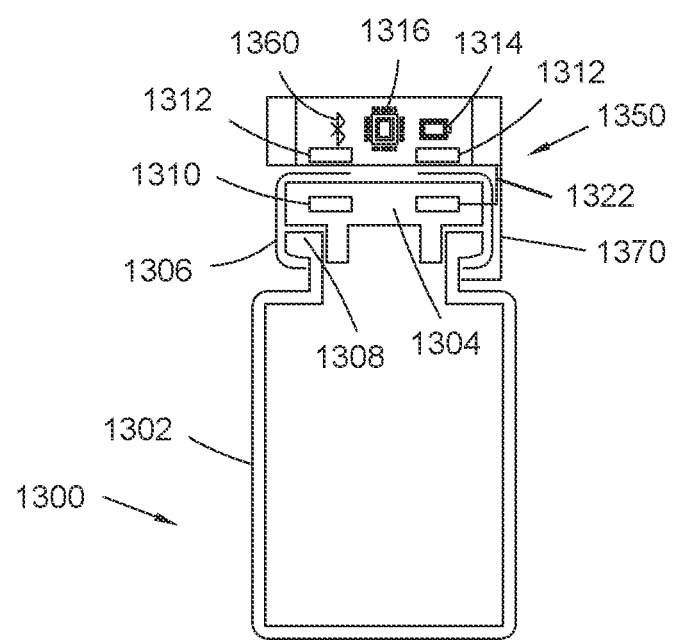
FIG. 13 shows a system determining Container closure Integrity for a container system comprising a second detection system integrated into a cap.

Turning now to FIGS. 12 and 13, in at least some embodiments, the detection circuitry for sensing the position of the embedded positioning component or the resistance of the force sensitive resistor can be provided in a cap.

Referring first to FIG. 12, the container system 1200 is similar to the container system described above with reference to FIGS. 7A and 7B, and includes a container 1202, an elastomeric stopper 1204, a positioning component 1210, and a retainer 1206 (illustrated as a crimped seal) holding the stopper 1204 in place against the rim 1208 of the container 1202.

A cap 1250 is placed over the seal stack of the container system 1200. The cap 1250 can be located on the container system 1200 with a push fit arrangement, bayonet arrangement, screw fit or any other suitable mechanism for securing the cap 1250 to the container system 1200. In the embodiment shown in FIG. 12, the embedded positioning component 1210 is a magnetic positioning component. The cap 1250 houses a magnetometer 1218 (e.g. a Hall effect sensor) for measuring a position of the magnetic element 1210, a power source 1214, and a microcontroller 1216 configured to determine the residual seal force or CCI based on the measured position of the magnetic element 1210. The cap 1250 may comprise a display (not shown) configured to indicate the CCI. This can be particularly useful for determining CCI at the point of care e.g. after the container system 1200 has been stored for a period of time and before the medicament is delivered.

Alternatively, the cap 1250 may comprise a communications module 1260 configured to communicate a measured value (e.g. distance D1, residual seal force, or a qualitative and/or quantitative CCI assessment) for display on an external device. The external device may be, for example, a mobile phone running a compatible application or mobile reader configured to communicate wirelessly with the communications module 1260 of the cap 1250. This configuration can also be particularly useful for determining CCI of a container system 1200 at the point of care, after a period of storage of the container and before the medicament is delivered. It will be appreciated that the cap 1250 is preferably configured so that the location of the sensor 1218 (e.g. a Hall effect sensor) relative to the rim 1208 of the container 1202 is known (so that distances D1 and D2 can be accurately determined). This can be implemented by controlling the position of the cap 1250 with respect to the container system 1200 when the cap 1250 is secured in place.

FIG. 13 shows another embodiment in which a cap 1350 comprising a microcontroller 1316 is configured to detect the CCI of a container system 1300. As shown in FIG. 13, the cap 1350 comprises a microcontroller 1316, a power source 1314, and a communications module 1360, similar to the cap of FIG. 12. The container system 1300 is similar to the container system described with reference to FIGS. 7A and 7B.

In the embodiment shown in FIG. 13, the detection system is configured to determine capacitance between the embedded electrically conductive element 1310 and a second capacitor plate 1312 (similar to the configuration shown in FIG. 9). In the embodiment shown in FIG. 13, the capacitor plate 1312 is shown in the cap 1350 but, as discussed above, the second capacitor plate can also be formed by the retainer 1306 when the retainer 1306 is configured as an electrically conductive seal around the stopper 1304 and the cap 1350 can comprise a suitable electrical contact for contacting the electrically conductive seal.

As shown in FIG. 13, the cap 1350 further comprises a hinge 1370. The hinge 1370 supports an electrical contact 1322 (similar to contact 1122 in FIG. 11) which extends into the cap 1350 to form the circuit, similar to the one shown schematically in FIG. 8.

It will be appreciated that the material and configuration of the retainer 1306 is configured to allow detection of the distance D1 between the plates 1312 and the element 1310 where the second capacitor plates 1312 are provided in the cap 1350. Similarly, the configuration and material for the retainer 1306 can be selected to allow the retainer 1306 to act as the second capacitor plate, in the manner described above.

In each of the embodiments described above, the retainer is shown as a crimped seal, extending around a flanged rim of the container. The crimped seal may be formed of aluminium or another metallic or conductive material, or the seal may be formed of a polymeric material suitably formed over the seal stack.

The retainer may also be formed as a cap rather than a crimped or formed seal. For example, the retainer may be a screw cap configured to engage complementary screw threads on the container. Other retainers configured to secure the stopper against the rim of the container are also possible.

Cap arrangements, as described with reference to FIGS. 12 and 13, can be combined with the seal-type retainers shown throughout the figures, or caps comprising detection circuitry may themselves be configured to compress the stopper against the rim of the container.

Of course, it will be appreciated that the hinged cap arrangement shown in FIG. 13 can also be applied to caps configured for sensing the position of a magnetic positioning component, of the type described with respect to FIG. 12.

In any of the embodiments described above, the detection circuitry can be configured to be powered using harvested energy, e.g. the detection circuitry can be configured for radio frequency (RF) harvesting. For this reason, the power source described for each of the systems described above may comprise an energy storage device, e.g. a battery, and/or an energy harvesting device, such as an antenna configured to receive RF energy from an external source and rectify it to generate the power required for the device. As well as RF antenna, energy harvesting devices suitable for use in the systems and methods described above can include solar cells, thermoelectric generators (TEG), and kinetic energy harvesting devices.

In some embodiments, the energy harvesting device can be configured to charge a battery to power one or more components of the device circuitry. In other embodiments, the energy harvesting device can be configured to directly power the components of the system. For example, the sensors described above (capacitance sensors, magnetic field sensors, and force sensitive resistance sensors) do not have large power consumption demands. The current required for operation of the sensors can be provided by the energy harvesting device, e.g. an RF antenna and appropriate rectifier. Moreover, because it is not necessary for the communications module and/or integrated display to be powered contemporaneously with the sensors, the power requirements of the system can be minimised to allow the system to operate within the operating limits of the power supplied by the energy harvesting device. Although the embodiments of FIG. 7A-13 have been described in the context of vial systems having an opening for withdrawing medicament, the skilled person will appreciate that the invention described above may also be employed in other medicament containment solutions. For example, the embodiments described above may be included in a medicament cartridge for a drug delivery device. In such embodiments, the detection circuitry (shown schematically in FIGS. 8-10) can be implemented in a drug delivery device to monitor and confirm the CCI of the medicament container inserted therein.

It will be appreciated by those skilled in the art that changes can be made to the embodiments described above without departing from the invention. In particular, the methods for determining CCI of a container system described above may further include the steps of providing any of the features of the detection systems or container systems described in connection with the devices described herein. Moreover, it will be understood that the features described in connection with one or more exemplary embodiments may be combined with features described in connection with other embodiments. Moreover, components described herein may be substituted for structurally similar or functionally equivalent components. Such modifications will be understood to fall within the scope of the present invention.

The invention claimed is:

1. A method for determining closure integrity of a container system, the container system comprising a container, an elastomeric stopper comprising an embedded positioning component, and a retainer for retaining the elastomeric stopper, and a cap comprising at least a portion of a detection system for detecting a position of the embedded positioning component, wherein the elastomeric stopper is confined between a rim of the container and the retainer to seal the container, the method comprising:
   determining, using the detection system, the position of the embedded positioning component; and
   determining, based on the position of the embedded positioning component, the closure integrity of the container system.

2. The method of claim 1, further comprising:
   determining a compression of the elastomeric stopper based on the position of the embedded positioning component, wherein the determining the closure integrity of the container system is based on the compression of the elastomeric stopper.

3. The method of claim 2, further comprising:
   correlating the compression with a residual seal force for the container system, wherein the determining the closure integrity of the container system is based on the residual seal force.

4. The method of claim 1, further comprising:
   calibrating the detection system for detecting the position of the embedded positioning component for a predetermined container system configuration to correlate the position of the embedded positioning component of the predetermined container system configuration with a residual seal force for the predetermined container system configuration.

5. The method according to claim 1, wherein:
   the embedded positioning component comprises a magnetic material, and
   determining the position of the embedded positioning component comprises detecting a magnetic field strength.

6. The method according to claim 5, wherein:
   the detection system comprises a sensor, and
   the sensor is configured to detect the magnetic field strength.

7. The method according to claim 1, wherein:
   the embedded positioning component comprises a first capacitor plate in a circuit, the detection system comprises a second capacitor plate in the circuit, and determining the position of the embedded positioning component comprises detecting a capacitance of the circuit.

8. The method of claim 7, wherein:
the detection system comprises a capacitance sensor, and
the capacitance sensor is configured to measure the capacitance of the circuit.

9. The method of claim 7, wherein;
the retainer comprises the second capacitor plate,
the retainer is made of at least an electrically conductive material, and
the method further comprises detecting a distance between the retainer and the embedded positioning component.

10. The method of claim 1, wherein the at least the portion of the detection system of the cap comprises:
a microcontroller;
detection circuitry;
a wireless communications module; and
a power source,
wherein the method further comprises communicating data associated with the closure integrity of the container system to a remote device for display.

11. A method for determining closure integrity fa container system, the container system comprising a container, an elastomeric stopper, a force sensitive resistor between the elastomeric stopper and a rim of the container, a retainer for retaining the elastomeric stopper, and a cap comprising at least a portion of a detection system for detecting a resistance of the force sensitive resistor, wherein the elastomeric stopper is confined between the rim of the container and the retainer to seal the container, the method comprising:
measuring, with the detection system, the resistance of the force sensitive resistor; and
determining, based on the resistance, the closure integrity of the container system.

12. The method of claim 11, further comprising:
determining a residual seal force based on the resistance, wherein determining the closure integrity of the container system is based on the residual seal force.

13. The method of claim 11, further comprising:
calibrating the detection system for a predetermined container system to correlate a measured resistance for the force sensitive resistor; and
determining the closure integrity of the container system is based on the measured resistance.

14. The method of claim 11, wherein the at least the portion of the detection system of the cap comprises:
a microcontroller;
detection circuitry;
a wireless communications module; and
a power source,
wherein the method further comprises communicating data associated with the closure integrity of the container system to a remote device for display.

15. A method of configuring, validating, or monitoring a filling line for container systems, at least one container system of the container systems comprising a container, an elastomeric stopper comprising an embedded positioning component, a retainer for retaining the elastomeric stopper, and a cap comprising at least a portion of a detection system for detecting a position of the embedded positioning component, wherein the elastomeric stopper is confined between a rim of the container and the retainer to seal the container, the method comprising:

filling and sealing the container of the at least one container system;
determining, using the detection system, the position of the embedded positioning component; and
determining, based on the position of the embedded positioning component, closure integrity of the at least one container system.

16. A method of configuring, validating, or monitoring a filling line for container systems, at least one container system of the container systems comprising a container, an elastomeric stopper, a retainer for retaining the elastomeric stopper, a force sensitive resistor between the elastomeric stopper and the retainer, and a cap comprising at least a portion of a detection system for detecting a resistance of the force sensitive resistor, wherein the elastomeric stopper is confined between a rim of the container and the retainer to seal the container, the method comprising:
filling and sealing the container of the at least one container system;
measuring, with the detection system, the resistance of the force sensitive resistor; and
determining closure integrity of the container system based on the resistance.

17. A detection system for determining Closure integrity of a container system, the container system comprising a container, an elastomeric stopper comprising an embedded positioning component, a retainer for retaining the elastomeric stopper between the retainer and a rim of the container, and a cap comprising at least a portion of the detection system, the detection system comprising:
a sensor configured to determine a position of the embedded positioning component within the container system; and
a controller configured to determine the closure integrity of the container system based on the position of the embedded positioning component.

18. The detection system of claim 17, wherein the controller is configured to determine:
compression of the elastomeric stopper based on the position of the embedded positioning component, and
the closure integrity of the container system based on the compression of the elastomeric stopper.

19. The detection system of claim 18, wherein the controller is further configured to:
correlate the compression of the elastomeric stopper with a residual seal force for the container system, and
determine the closure integrity of the container system based on the residual seal force.

20. The detection system of claim 17, wherein the controller is calibrated for detecting the position of the embedded positioning component for a predetermined container system configuration to correlate the position of the embedded positioning component for the predetermined container system configuration with a residual seal force for the predetermined container system configuration.

21. The detection system of claim 17, wherein:
the embedded positioning component comprises a magnetic material, and
the sensor is configured to detect a magnetic field strength.

22. The detection system of claim 17, wherein:
the embedded positioning component comprises a first capacitor plate in a circuit,
the detection system comprises a second capacitor plate in the circuit, and the controller is configured to determine the position of the embedded positioning component by detecting a capacitance of the circuit.

23. The detection system of claim 22, wherein the sensor is configured to measure the capacitance of the circuit.

24. The detection system of claim 23, wherein:
the retainer comprises the second capacitor plate,
the retainer further comprises a seal made at least of an electrically conductive material, and
the sensor is configured to detect a distance between the seal and the embedded positioning component.

25. The detection system of claim 24, wherein the at least the portion of the detection system of the cap comprises:
a microcontroller;
detection circuitry;
a wireless communications module; and
a power source,
wherein the wireless communications module is configured to communicate data associated with the closure integrity of the container system to a remote device for display.

26. A container system comprising:
a seal;
a container;
an elastomeric stopper comprising an embedded positioning component;
a retainer for retaining the elastomeric stopper between the retainer and a rim of the container; and
a cap comprising at least a portion of a detection system for detecting a position of the embedded positioning component,
wherein the embedded positioning component comprises at least one of a magnetic material or an electrically conductive material.

27. The container system of claim 26, wherein the at least the portion of the detection system of the cap comprises:
a microcontroller;
detection circuitry comprising a sensor for detecting the position of the embedded positioning component;
a wireless communications module; and
a power source,
wherein the wireless communications module is configured to communicate data associated with closure integrity of the container system to a remote device for display.

28. A container system comprising:
a seal;
a container;
an elastomeric stopper;
a retainer for retaining the elastomeric stopper, wherein the elastomeric stopper is confined between a rim of the container and the retainer to seal the container;
a force sensitive resistor between the elastomeric stopper and the rim of the container or the retainer; and
a cap comprising at least a portion of a detection system for detecting a resistance of the force sensitive resistor.

29. The container system of claim 28, wherein the at least the portion of the detection system of the cap comprises:
a microcontroller;
detection circuitry configured to measure a resistance of the force sensitive resistor;
a wireless communications module; and
a power source,
wherein the wireless communications module is configured to communicate data associated with closure integrity of the container system to a remote device for display.

30. The container system of claim 29, wherein:
the cap further comprises a hinge, and
the hinge comprises an electrical contact providing contact between:
at least one of the microcontroller, the power source, or the detection circuitry; and
the force sensitive resistor.

* * * * *